United States Patent
Stewart

(10) Patent No.: US 9,743,035 B2
(45) Date of Patent: Aug. 22, 2017

(54) PROCESSING SYSTEM WITH TRANSPORT STREAM AGGREGATION AND METHODS FOR USE THEREWITH

(71) Applicant: ViXS Systems, Inc., Toronto (CA)

(72) Inventor: Norman Vernon Douglas Stewart, Toronto (CA)

(73) Assignee: VIXS SYSTEMS, INC., Toronto (CA)

( * ) Notice: Subject to any disclaimer, the term of this patent is extended or adjusted under 35 U.S.C. 154(b) by 164 days.

(21) Appl. No.: 14/301,805

(22) Filed: Jun. 11, 2014

(65) Prior Publication Data

US 2015/0264097 A1 Sep. 17, 2015

Related U.S. Application Data

(60) Provisional application No. 61/954,188, filed on Mar. 17, 2014.

(51) Int. Cl.
| | | |
|---|---|---|
| G06F 15/16 | (2006.01) | |
| H04N 7/01 | (2006.01) | |
| H04L 29/06 | (2006.01) | |
| H04N 5/44 | (2011.01) | |
| H04N 7/08 | (2006.01) | |
| H04N 21/44 | (2011.01) | |
| H04N 21/4402 | (2011.01) | |
| H04N 21/434 | (2011.01) | |
| H04L 29/08 | (2006.01) | |

(52) U.S. Cl.
CPC ......... *H04N 7/0127* (2013.01); *H04L 65/605* (2013.01); *H04L 65/607* (2013.01); *H04L 65/80* (2013.01); *H04L 67/1095* (2013.01); *H04L 69/22* (2013.01); *H04N 5/4401* (2013.01); *H04N 7/0117* (2013.01); *H04N 7/0806* (2013.01); *H04N 21/4344* (2013.01); *H04N 21/44004* (2013.01); *H04N 21/440218* (2013.01)

(58) Field of Classification Search
CPC ..... H04L 65/60; H04L 65/604; H04L 65/605; H04L 69/22; H04N 21/4344; H04N 21/4341; H04N 21/4347; H04N 21/434; H04N 21/44004; H04N 5/4401
See application file for complete search history.

(56) References Cited

U.S. PATENT DOCUMENTS

| | | | |
|---|---|---|---|
| 7,508,454 B1 * | 3/2009 | Vantalon | H04N 21/42623 348/385.1 |
| 2005/0111470 A1 * | 5/2005 | Memarzadeh | H04L 65/604 370/412 |
| 2008/0170529 A1 * | 7/2008 | Connors | H04N 21/435 370/312 |

* cited by examiner

*Primary Examiner* — Nam Tran
(74) *Attorney, Agent, or Firm* — Garlick & Markison; Bruce E. Stuckman

(57) ABSTRACT

A processing system includes a transport stream aggregator that receives a plurality of transport streams in a transport stream format and that generates an aggregated transport stream in response. The transport stream aggregator processes transport stream packets of the plurality of transport streams and replaces a packet synchronization field with a customized synchronization field. A processing device is configured to generate a processed video signal from the aggregated transport stream.

10 Claims, 9 Drawing Sheets

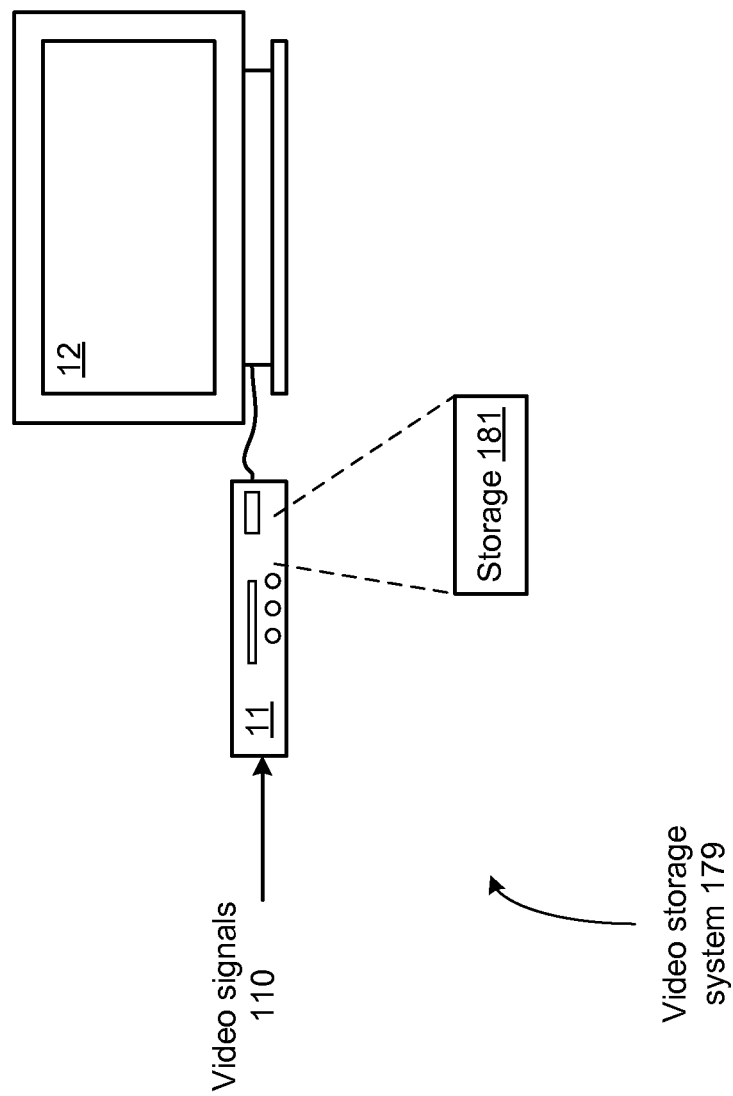

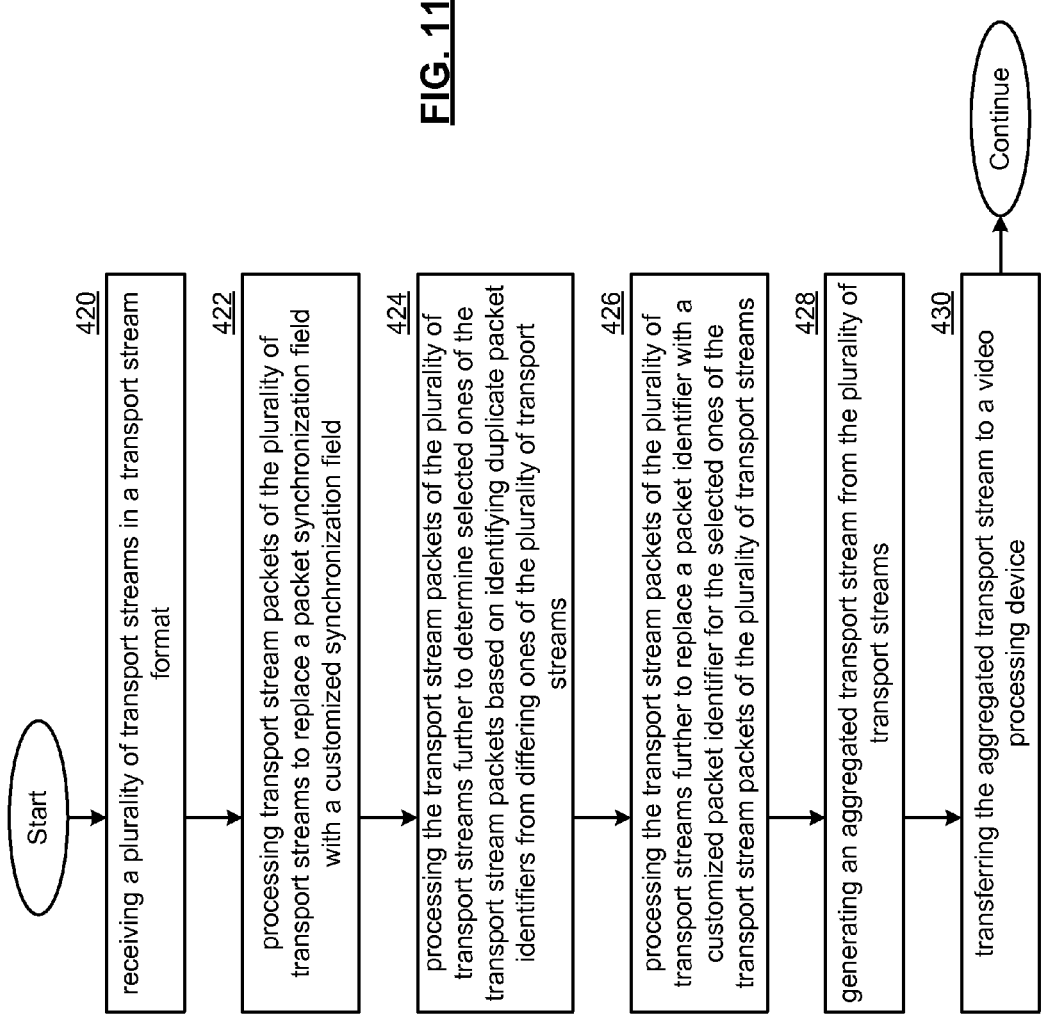

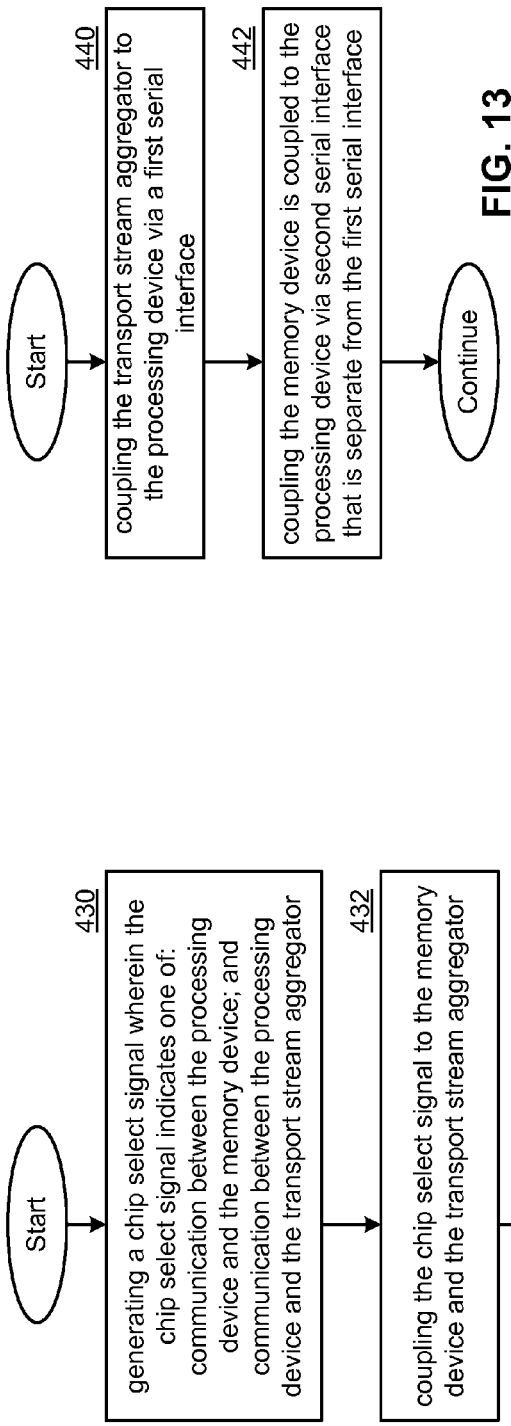
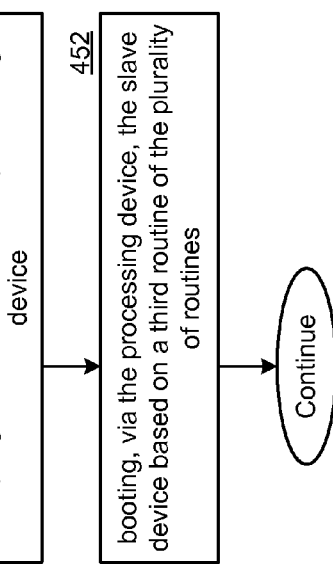
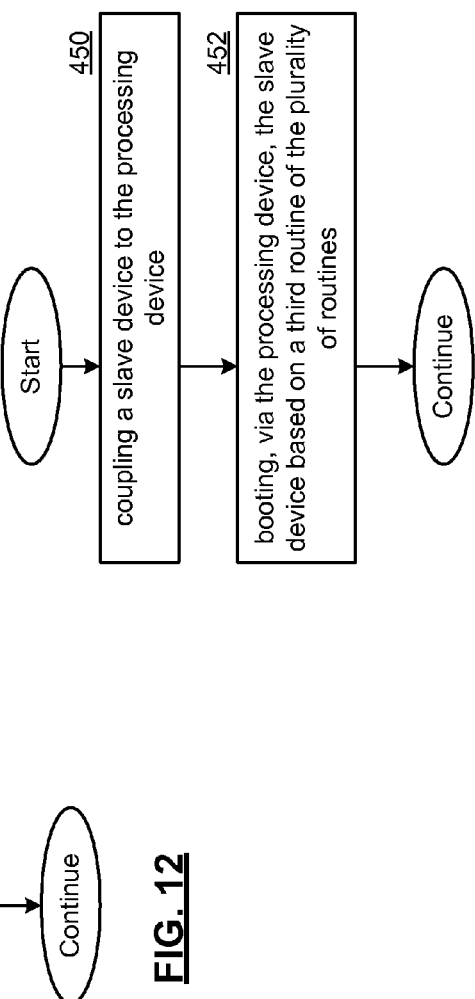

US 9,743,035 B2

PROCESSING SYSTEM WITH TRANSPORT STREAM AGGREGATION AND METHODS FOR USE THEREWITH

CROSS REFERENCE TO RELATED PATENTS

The present U.S. Utility Patent Application claims priority pursuant to 35 U.S.C. §119(e) to U.S. Provisional Application No. 61/954,188, entitled "PROCESSING SYSTEM WITH TRANSPORT STREAM AGGREGATION AND METHODS FOR USE THEREWITH", filed Mar. 17, 2014, which is hereby incorporated herein by reference in its entirety and made part of the present U.S. Utility Patent Application for all purposes.

TECHNICAL FIELD OF THE DISCLOSURE

The present disclosure relates to processing of transport streams such as video transport streams.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). The video signal encoded by these encoding methods must be similarly decoded for playback on most video display devices. While this standard sets forth many powerful techniques, further improvements are possible to improve the performance and speed of implementation of such methods. Efficient and fast encoding and decoding of video signals is important to the implementation of many video devices, particularly video devices that are destined for home use.

The limitations and disadvantages of conventional and traditional approaches will become apparent to one of ordinary skill in the art through comparison of such systems with the present disclosure.

BRIEF DESCRIPTION OF THE SEVERAL VIEWS OF THE DRAWINGS

FIG. 8 presents a block diagram representation of a video storage system 179 in accordance with an embodiment of the present disclosure.

FIG. 11 presents a flowchart representation of a method in accordance with an embodiment of the present disclosure.

FIG. 12 presents a flowchart representation of a method in accordance with an embodiment of the present disclosure.

FIG. 13 presents a flowchart representation of a method in accordance with an embodiment of the present disclosure.

FIG. 14 presents a flowchart representation of a method in accordance with an embodiment of the present disclosure.

DETAILED DESCRIPTION

Figure 1:
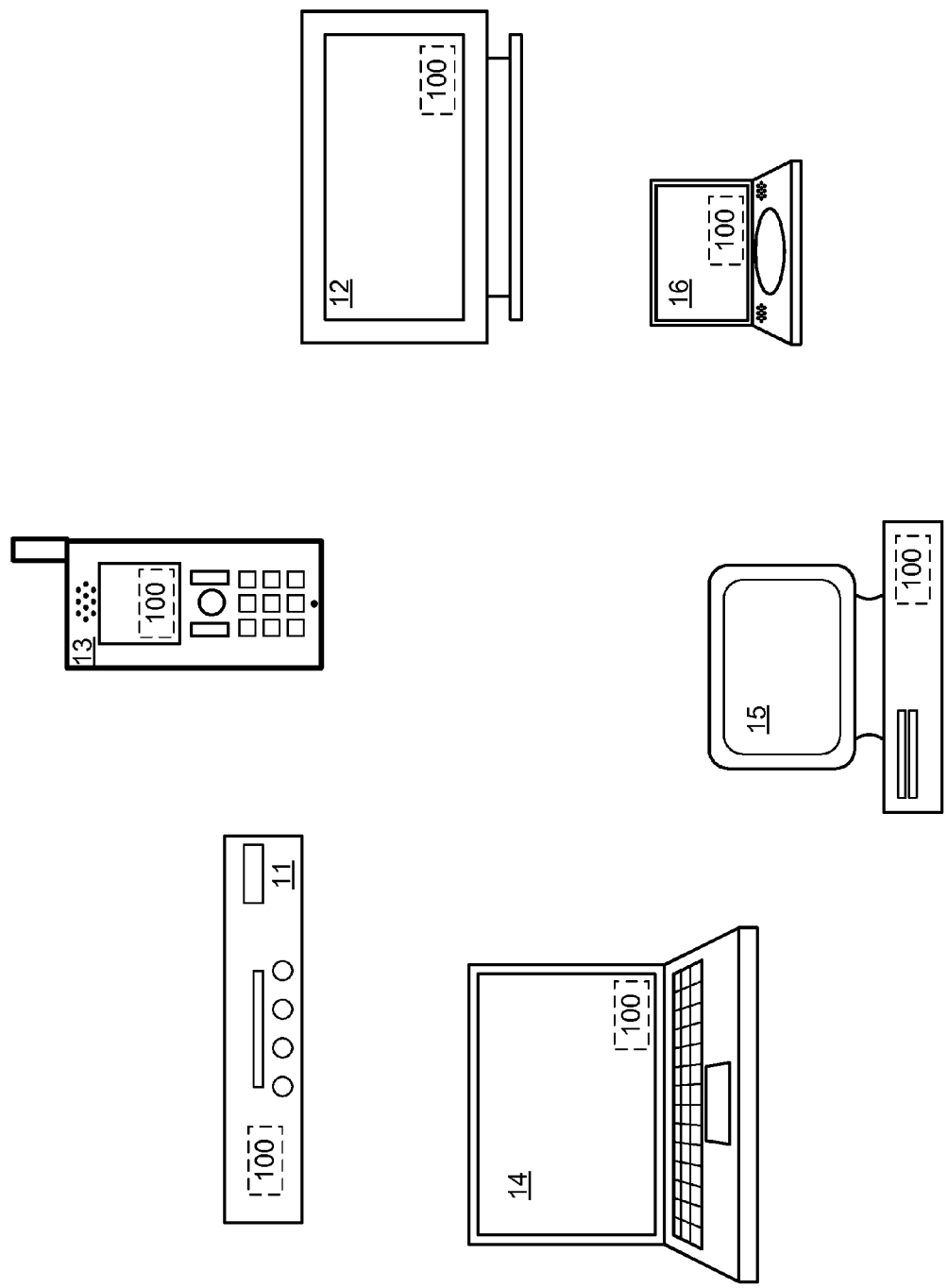
FIG. 1 presents a pictorial representation of example devices 11-16 that can include a processing system 100 in accordance with an embodiment of the present disclosure.

FIG. 1 presents a pictorial representation of example devices 11-16 that can include a processing system 100 in accordance with an embodiment of the present disclosure. In particular, these example devices include digital video recorder/set top box 11, television or monitor 12, wireless telephony device 13, computers 14 and 15, personal video player 16, or other devices that include a processing system 100.

Processing system 100 will be described in greater detail in conjunction with FIGS. 2-14, including several optional functions and features.

Figure 2:
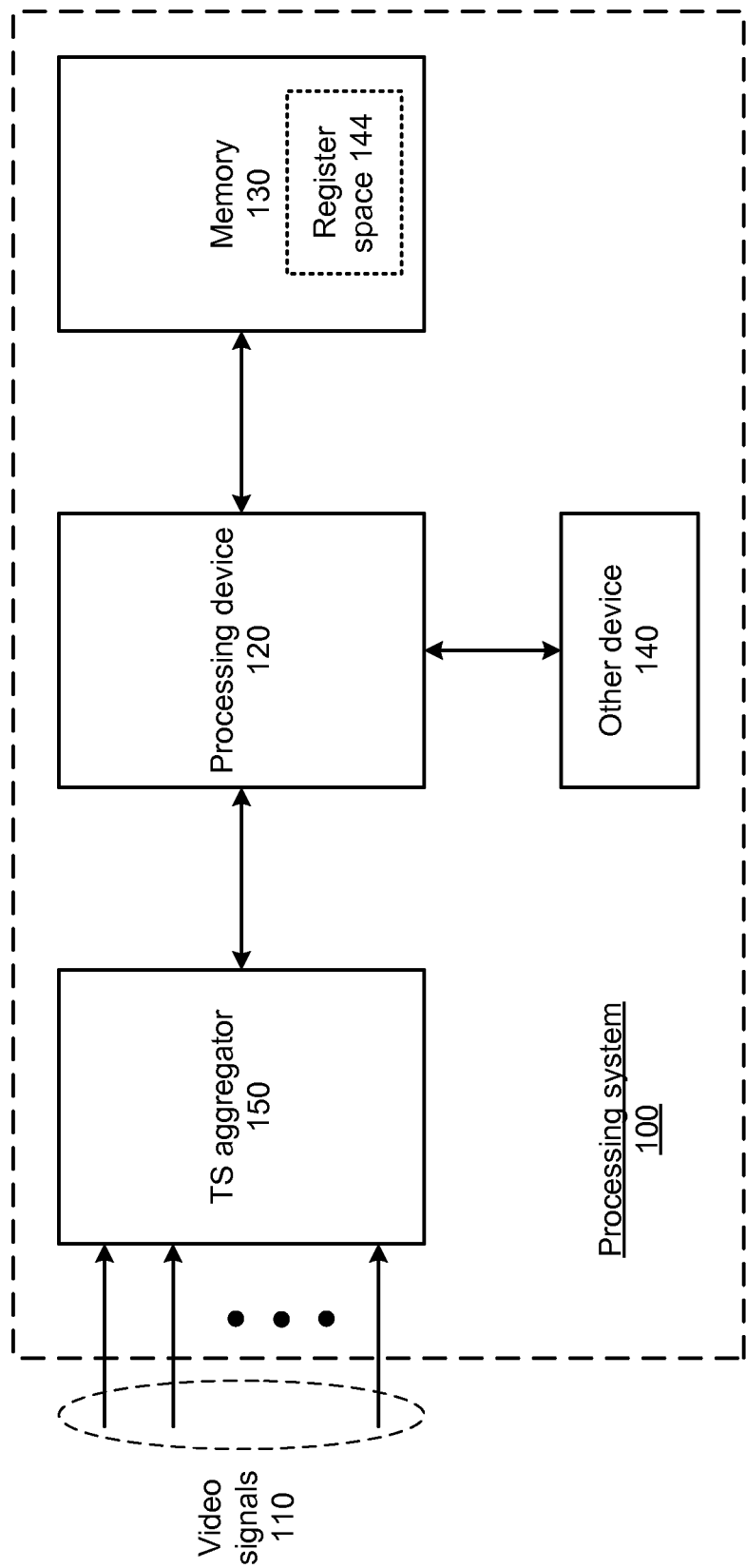
FIG. 2 presents a block diagram representation of a processing system 100 in accordance with an embodiment of the present disclosure.

FIG. 2 presents a block diagram representation of a processing system 100 in accordance with an embodiment of the present disclosure. In particular, processing system 100 includes transport stream aggregator 150, processing device 120, memory device 130 and slave device 140. While a particular architecture is shown, alternative architectures using direct connectivity between one or more modules and/or buses can likewise be implemented in accordance with the present disclosure. In an embodiment of the present disclosure, processing device 120 is implemented via a system on a chip integrated circuit. Further, processing system 100 can include one or more additional modules that are not specifically shown such as other slave devices 140 and/or other devices or modules.

Memory device 130 stores a plurality of routines to be executed by the processing device 120, the TS aggregator 150 and/or the slave device 140. These routines include software such as boot code, an operating system such as a Linux, Mac OS, MS Windows, Solaris or other operating system and/or one or more applications to be executed by the modules of processing system 100. The memory device 130 optionally includes a register space 144 having a plurality of registers, buffer space and data space for each of the modules of processing system 100 and storage space for other data files, system data, drivers, utilities and other system programs, and other data. Memory device 130 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information.

The processing device 120 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory device 130. Note that when the processing device 120 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In operation, the transport stream (TS) aggregator receives a plurality of video signals 110 as individual transport streams in one or more transport stream formats. TS aggregator 150 generates an aggregated transport stream in response to the video signals 110. The processing device 120 is configured to generate a processed video signal from the aggregated transport stream.

Video signals 110 are formatted in accordance with a transport stream format such as H.264, MPEG-4 Part 10 Advanced Video Coding (AVC), high efficiency video coding (HEVC), VC-1 or other digital format such as a Moving Picture Experts Group (MPEG) format (such as MPEG1, MPEG2 or MPEG4), Quicktime format, Real Media format, Windows Media Video (WMV), Audio Video Interleave (AVI), high definition media interface (HDMI) or another digital video format, either standard or proprietary.

Video signals 110 can be generated in association with a set-top box, television receiver, personal computer, cable television receiver, satellite broadcast receiver, broadband modem, 3G transceiver, a broadcast satellite system, internet protocol (IP) TV system, the Internet, a digital video disc player, a digital video recorder, or other video device. In an embodiment, the video signals 110 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signal 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

The processing device 120 is operable to decode, transrate, transcrypt, transcale and/or otherwise decode or transcode one or more of the video signals 110 from the aggregated transport stream. In operation, the processing device 120 operates in accordance with many of the functions and features of the H.264, MPEG-4 Part 10 Advanced Video Coding (AVC), HEVC, VC-1 or other digital format such as a Moving Picture Experts Group (MPEG) format (such as MPEG1, MPEG2 or MPEG4), VC-1 (SMPTE standard 421M), Quicktime format, Real Media format, Windows Media Video (WMV), Audio Video Interleave (AVI), high definition media interface (HDMI) or another digital video format, either standard or proprietary or other video format, to decode or transcode video signals 110 to form one or more processed video signals.

While not expressly shown, each of the video signals 110 can be generated by a separate tuner or demodulator that generates a corresponding transport stream as an output. Consider an example where the processing system 100 is implemented in a cable card, computer or set top box that supports the contemporaneous reception for two or more video signals. The transport stream aggregator 150 can generate a single aggregated transport stream 232 for transfer to the processing device 120 for either transcoding or decoding. While the processing device may need to re-separate these individual transport streams for processing, the creation of an aggregate transport stream 232 simplifies the interface between the transport stream aggregator and the processing device.

The slave device 140 can be an interface module to input the plurality of video signals 110 and/or output a processed video signal generated by processing device 120. In accordance with these embodiments the slave device 140 can be a wireless transceiver that operates a WLAN, Bluetooth connection, infrared connection, wireless telephony receiver or other wireless data connection, or a wired modem or other network adaptors that uses a wired receiver or other device to receive a signal from a LAN, the Internet, cable network, telephone network or other network or from another device in accordance with an Ethernet protocol, a memory card protocol, USB protocol, Firewire (IEEE 1394) protocol, SCSI protocol, PCMCIA protocol, or other protocol either standard or proprietary. In examples of slave devices include encryption/decryption engines, arithmetic processing devices such as vector processing units or other arithmetic devices, other hardware accelerators or function specific devices, or other slave devices.

As discussed above, the memory device 130 stores a plurality of routines to be executed by the processing device 120, the TS aggregator 150 and/or the slave device 140. During initialization of the processing system 100, the processing device 120 is booted based on a first routine of the plurality of routines. For example, the processing device 120 is booted by executing a self-initialization and retrieving the first routine from the memory device 130. The processing device 120 further operates as a boot master to boot the transport stream aggregator 150 based on a second routine of the plurality of routines that includes the boot code for the transport stream aggregator 150. In this embodiment, the processing device 120 boots the transport stream aggregator 150 by retrieving the second routine from the memory device 130 and by pushing the second routine to the transport stream aggregator 150. The processing device 120 boots the slave device 140 by retrieving a third routine from the memory device 130 that includes the boot code for the slave device and by pushing the third routine to the slave device.

Further details regarding the operation of transport stream aggregator 150 and processing device 120 including several optional functions and features are presented in conjunction with examples discussed in association with FIGS. 3-6.

Figure 3:
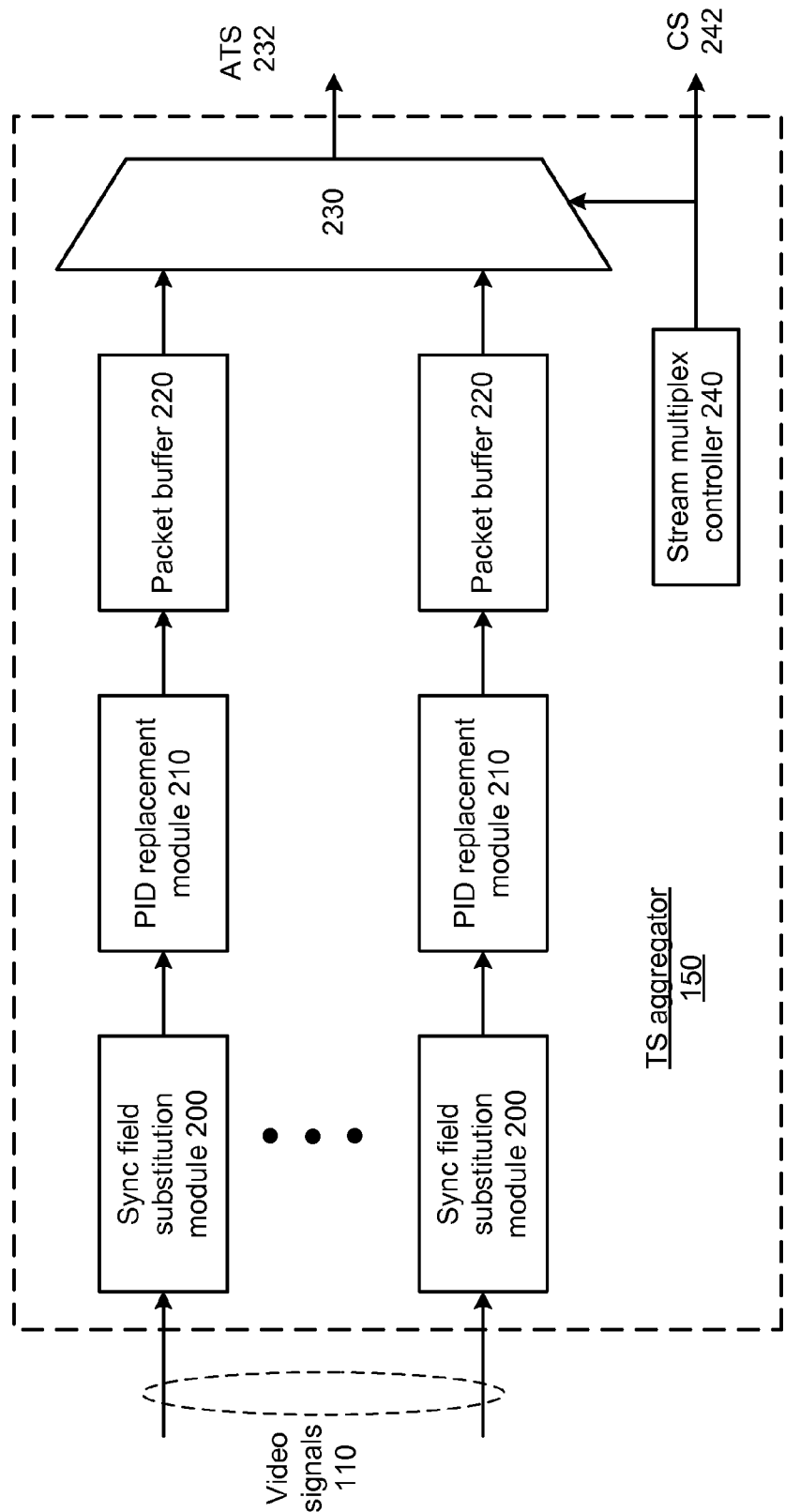
FIG. 3 presents a block diagram representation of a transport stream aggregator 150 in accordance with an embodiment of the present disclosure.

FIG. 3 presents a block diagram representation of a transport stream aggregator 150 in accordance with an embodiment of the present disclosure. In this embodiment, the transport stream aggregator 150 supports a reduction in the total number of serial transport streams that are input to a transport stream processing device, such as processing device 120. In particular, the transport stream aggregator 150 multiplexes a plurality of serial transport streams down to a single transport stream.

As shown, transport stream aggregator 150 includes a plurality of parallel processing paths, each corresponding to one of the plurality of transport streams represented by the video signals 110. Each processing path includes a sync field substitution module 200, a packet identifier (PID) replacement module 210 and a packet buffer 220. In addition, the transport stream aggregator 150 includes a stream multiplex controller 240 and a multiplexer 230.

In an embodiment, the elements of transport stream aggregator 150 are implemented via using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the transport stream aggregator 150 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In a mode of operation, each of the sync field substitution modules 200 process the transport stream packets of a corresponding transport stream and replaces a packet synchronization field with a customized synchronization field. In particular, the customized synchronization field includes a stream identifier (SID) that indicates one of the plurality of transport streams. Considering the example where MPEG transport streams are aggregated, the standard transport stream synchronization byte (0x47) is replaced by a unique stream identification byte in order to allow unique identification or SID/PID combinations. A programmable value may be implemented to enable the remapping of the synchronization byte on a stream-by-stream basis. The mapping can implement the following replacement based on functions of the packet ID values of the first packet PID0, and stream identifiers SIDj, where n<m.

$$\{SID0(0x47/PID0)+SID1(0x47/PID0)\} \rightarrow \{SIDj(m/PID0)+SIDj(n/PID0)\};$$

While a particular mapping is illustrated above, other mappings and/or other functions can be used to generate the customized stream identifiers.

PID replacement may be required in order to avoid PID collision/duplication of PID's in the aggregated transport stream 232. The PID replacement module 210 identifies duplicate PIDs and substitutes customized PIDs for duplicate PIDs to allow unique processing of PIDs by the processing device 120. The PID replacement modules 210 each processes the transport stream packets of the corresponding transport streams to replace a packet identifier with a customized packet identifier for selected ones of the transport stream packets of the plurality of transport streams. In particular, the PID replacement modules 210 each process transport stream packets to determine the selected ones of the transport stream packets based on identifying duplicate packet identifiers from differing ones of the plurality of transport streams. The PID replacement modules 210 replaces the packet identifier with the customized packet identifier for the selected ones of the transport stream packets to modify the packet identifiers as necessary to avoid duplicate packet identifiers.

The further operation of PID replacement module 210 can be described in conjunction with the following example that includes several optional functions and features. For example, the PID replacement module 210 can include a programmable table to implement the remapping of selected PID's on a stream-by-stream basis. Consider the example where m transport streams are aggregated. The programmable table can implement the following replacement based on functions of the packet ID values, PIDi, and stream identifiers SIDj, where $0 \leq i \leq n$ and where $0 \leq j \leq m$.

$$\{SID0(PID0)+SID1(PID0)\} \text{ is mapped to } \{SIDx(PID0)+SIDx(PIDn)\}$$

While a particular mapping is illustrated above, other mappings and/or other functions can be used to generate the customized packet identifiers. Also, while the sync field substitution module 200 and PID replacement module 210 are presented in a particular order, the order of these modules can be reversed.

In order to transmit the aggregate stream without loss of data, a buffer mechanism is required in order to accommodate the concurrent arrival of multiple stream packets. The packet buffers 220 buffers the plurality of transport streams. The packet buffers 220 must be emptied at a rate greater than or equal to the aggregate fill rate of the buffer. In the example shown, a separate packet buffer 220 is provided for each originating stream. Assuming the input transport streams have the same rate, each packet buffer 220 can be emptied in a time division multiplexed strategy at equal proportions and periods per buffer. If different transport streams rates are present, the packet buffers 220 can be emptied in proportion to the corresponding rate.

The multiplexer 230 multiplexes the plurality of transport streams into the aggregated transport stream 232 under control of one or more control signals (CS) 242. The stream multiplex controller 240 generates at least one control signal 242 to control the multiplexing of the plurality of the transport streams into the aggregated transport stream 232. In addition, the control signals 242 can further be used to control the transfer of the aggregated transport stream (ATS) 232 to the processing device 120. In an embodiment, the control signal 242 includes a gated transport stream clock.

Figure 4:
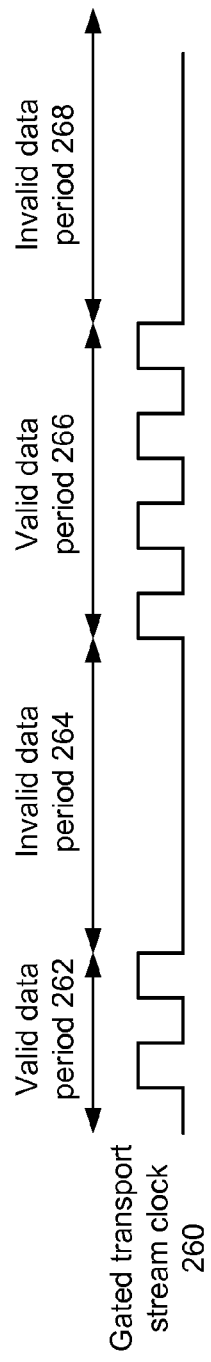
FIG. 4 presents a timing diagram representation of a gated transport stream clock 260 in accordance with a further embodiment of the present disclosure.

FIG. 4 presents a timing diagram representation of a gated transport stream clock 260 in accordance with a further embodiment of the present disclosure. In an embodiment, in addition to multiplexing a plurality of serial transport streams down to a single transport stream, the transport stream aggregator 150 further reduces the required pin count on the input interface to processing device 120 by removal of unnecessary signaling. As discussed in conjunction with FIG. 3, the control signals 242 can include a gated transport stream clock, an example of which is shown.

Consider the example where the processing device 120 is an XCODE processor or other processing device that supports gating of the transport stream input clock. In this case, the transport stream aggregator 150 need not generate a separate control signal 242 that indicates the presence of valid data on the output. The transport stream aggregator merely toggles the transport stream input clock for periods when a valid bit transmitted, but otherwise keeps the clock in an active low state. In the example shown, the gated transport stream clock 260 includes clock pulses in periods 262 and 266 corresponding to valid data from the transport stream aggregator 150 and no clock pulses in periods 264 and 268 corresponding to no valid data from the transport stream aggregator 150—e.g. when the transport stream aggregator 150 is not ready to transfer the next data element.

In a further embodiment, if the aggregated transport stream 232 can be guaranteed to contain only valid packets, all of which are equal size, the transport stream aggregator 150 may not be required to generate a control signal 242 for synchronization. In an embodiment, the processing device 120 employs an implicit sync feature, which allows the transport stream input interface to dynamically obtain and retain packet synchronization under the provisions stated above. In this fashion, the interface between transport stream aggregator 150 and the processing device 120 may be as simple as two lines—a data line and the gated transport stream clock 260.

Note however, that a change in packet size or input of non-packet data during the inter-packet time will force the loss of sync and subsequent loss of packet data during the resynchronization process. Further note that any substitution of the synchronization field described in conjunction with FIG. 3 will need to be compatible with the implicit synchronization of processing device 120, if implemented.

Figure 5:
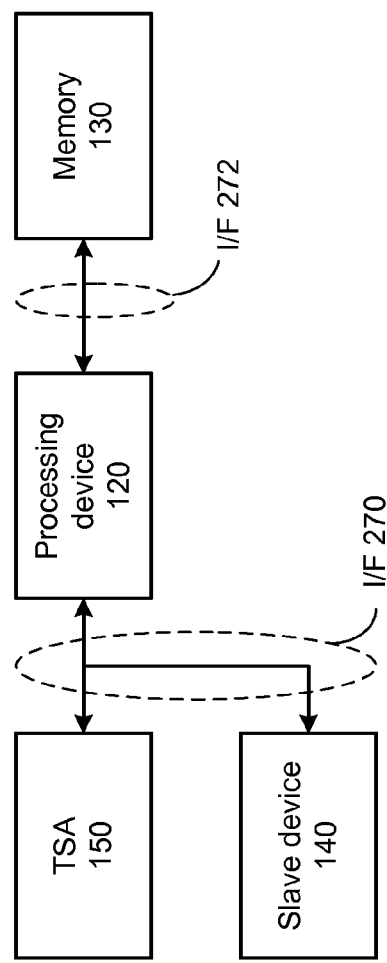
FIG. 5 presents a block diagram representation of an interface architecture in accordance with an embodiment of the present disclosure.

FIG. 5 presents a block diagram representation of an interface architecture in accordance with an embodiment of the present disclosure. In particular, an architecture is shown that includes elements described in conjunction with FIGS. 2-3 that are referred to by common reference numerals.

In a system with multiple devices which require persistent storage of software, memory device 130 is implemented via a single flash memory device in order to reduce memory bandwidth. In order to support this reduction in the total number of storage devices for boot code, the architecture shown is used to boot one or more devices including the transport stream aggregator 150 and the slave device 140 as slaves to the processing device 120. In the embodiment shown, the transport stream aggregator 150 and slave device 140 are coupled to the processing device 120 via a serial interface 270 and the memory device 130 is coupled to the processing device 120 via serial interface 272 that is separate from the serial interface 270.

In this example, the processing device 120 operates as a Boot Master and the transport stream aggregator 150 and slave device 140 operate as Boot Slaves. The memory device 130 stores software for both the Boot Master and Boot Slaves. The Boot Master is the first device to boot and will have dedicated control of the Memory device 130. The Boot Master is responsible for retrieving its own boot code and completing self-initialization. Subsequently, the Boot Master deasserts, in turn, each slave reset and, in turn, proceeds to push slave boot code and initialization sequence to each Boot Slave using the serial interface 270. Each Boot Slave device is under the control of the Boot Master. The size and format of the slave software does not require predefinition. As the processing device 120 is required to boot, prior to slave initialization and software upload, the specific encoding of the slave software and initialization routine may be embedded in the code of the processing device 120.

In an embodiment, the Boot Slaves may be required to support a serial interconnect slave interface which the Boot Master uses to initialize the slave device and upload software. The serial interface 270 operates in accordance with a first interface protocol and the serial interface 272 operates in accordance with a second interface protocol that is different from the first interface protocol. Example serial interfaces are SPI or I2C.

In one example, the interface 270 is an I2C interface and the interface 272 is an SPI interface. Since each Boot Slave device resides on an I2C bus with other I2C devices. Each Boot Slave device requires a unique address.

Figure 6:
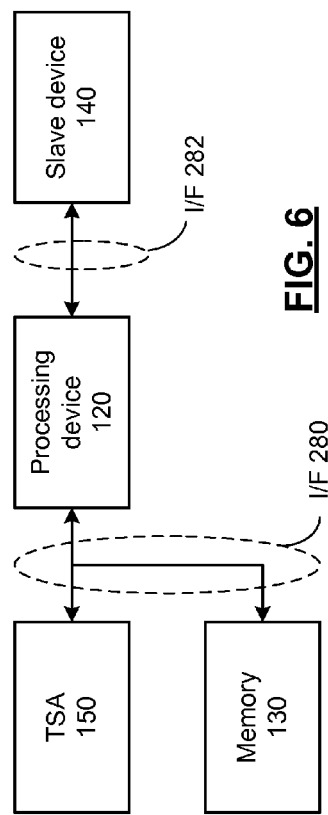
FIG. 6 presents a block diagram representation of an interface architecture in accordance with an embodiment of the present disclosure.

FIG. 6 presents a block diagram representation of an interface architecture in accordance with an embodiment of the present disclosure. In particular, an architecture is shown that includes elements described in conjunction with FIGS. 2-3 that are referred to by common reference numerals.

Like the embodiment shown in conjunction with FIG. 5, memory device 130 is implemented via a single flash memory device in order to reduce memory bandwidth. In order to support this reduction in the total number of storage devices for boot code, the architecture shown is used to boot one or more devices including the transport stream aggregator 150 and the slave device 140 as slaves to the processing device 120. In the embodiment shown, the transport stream aggregator 150 and memory device 130 are coupled to the processing device 120 via a serial interface 280 and the slave device 140 is coupled to the processing device 120 via serial interface 282 that is separate from the serial interface 280.

Like the embodiment shown in conjunction with FIG. 5, the processing device 120 operates as a Boot Master and the transport stream aggregator 150 and slave device 140 operate as Boot Slaves. The memory device 130 stores software for both the Boot Master and Boot Slaves. The Boot Master is the first device to boot and will have dedicated control of the Memory device 130. The Boot Master is responsible for retrieving its own boot code and completing self-initialization. Subsequently, the Boot Master deasserts, in turn, each slave reset and, in turn, proceeds to push slave boot code and initialization sequence to each Boot Slave using the serial interfaces 280 and 282. Each Boot Slave device is under the control of the Boot Master. The size and format of the slave software does not require predefinition. As the processing device 120 is required to boot, prior to slave initialization and software upload, the specific encoding of the slave software and initialization routine may be embedded in the code of the processing device 120.

In one example, the interface 282 is an I2C interface and the interface 280 is an SPI interface. The transport stream aggregator 150 operates as an SPI Boot Slave device, residing in a SPI serial topology with tri-state data output and shared data input. In this case, the memory 130 and transport stream aggregator 150 are provided a dedicated chip select signal from the Boot Master to enable and disable communications. In operation, the processing device 120 generates a chip select signal that is coupled to the memory device 130 and the transport stream aggregator 150. The chip select signal indicates one of: communication between the processing device 120 and the memory device 130; and communication between the processing device 120 and the transport stream aggregator 150.

Figure 7:
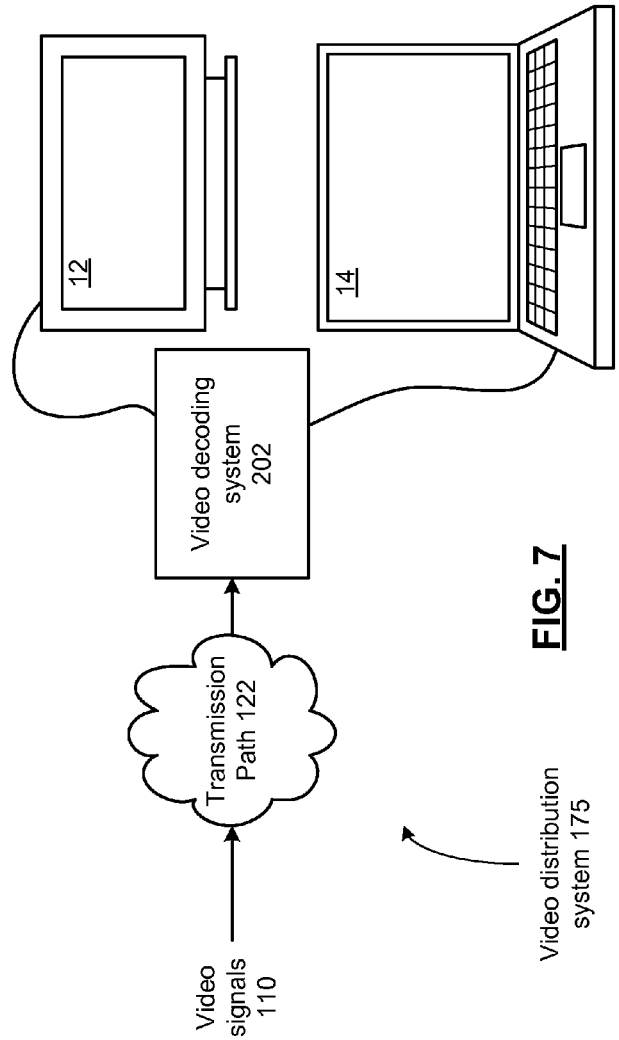
FIG. 7 presents a block diagram representation of a video distribution system 175 in accordance with an embodiment of the present disclosure.

FIG. 7 presents a block diagram representation of a video distribution system 175 in accordance with an embodiment of the present disclosure. In particular, video signals 110 are transmitted via a transmission path 122 to a video decoder 202. Video decoder 202, in turn can operate to decode the video signals 110 for display on a display device such as television 12, computer 14 or other display device.

The transmission path 122 can include a wireless path that operates in accordance with a wireless local area network protocol such as an 802.11 protocol, cellular 4G or other cellular data protocol, a WIMAX protocol, a Bluetooth protocol, or other wireless protocol. Further, the transmission path can include a wired path that operates in accordance with a wired protocol such as a USB protocol, high-definition multimedia interface (HDMI) protocol an Ethernet protocol or other high speed protocol.

FIG. 8 presents a block diagram representation of a video storage system 179 in accordance with an embodiment of the present disclosure. In particular, device 11 is a set top box with built-in digital video recorder functionality, a stand alone digital video recorder, a DVD recorder/player or other device that transcodes the video signals 110 for storage 181 and/or decodes the video signals 110 for display on video display device such as television 12. Storage 181 can include a hard disk drive optical disk drive or other disk drive, read-only memory, random access memory, volatile memory, non-volatile memory, static memory, dynamic memory, flash memory, cache memory, and/or any device that stores digital information. Storage 181 can be integrated in the device 11 or coupled to the device 11 via a network, wireline coupling or other connection.

While these particular devices are illustrated, video storage system 179 can include a hard drive, flash memory device, computer, DVD burner, or any other device that is capable of generating, storing, decoding and/or displaying a video stream in accordance with the methods and systems described in conjunction with the features and functions of the present disclosure as described herein.

Figures 9, 10:
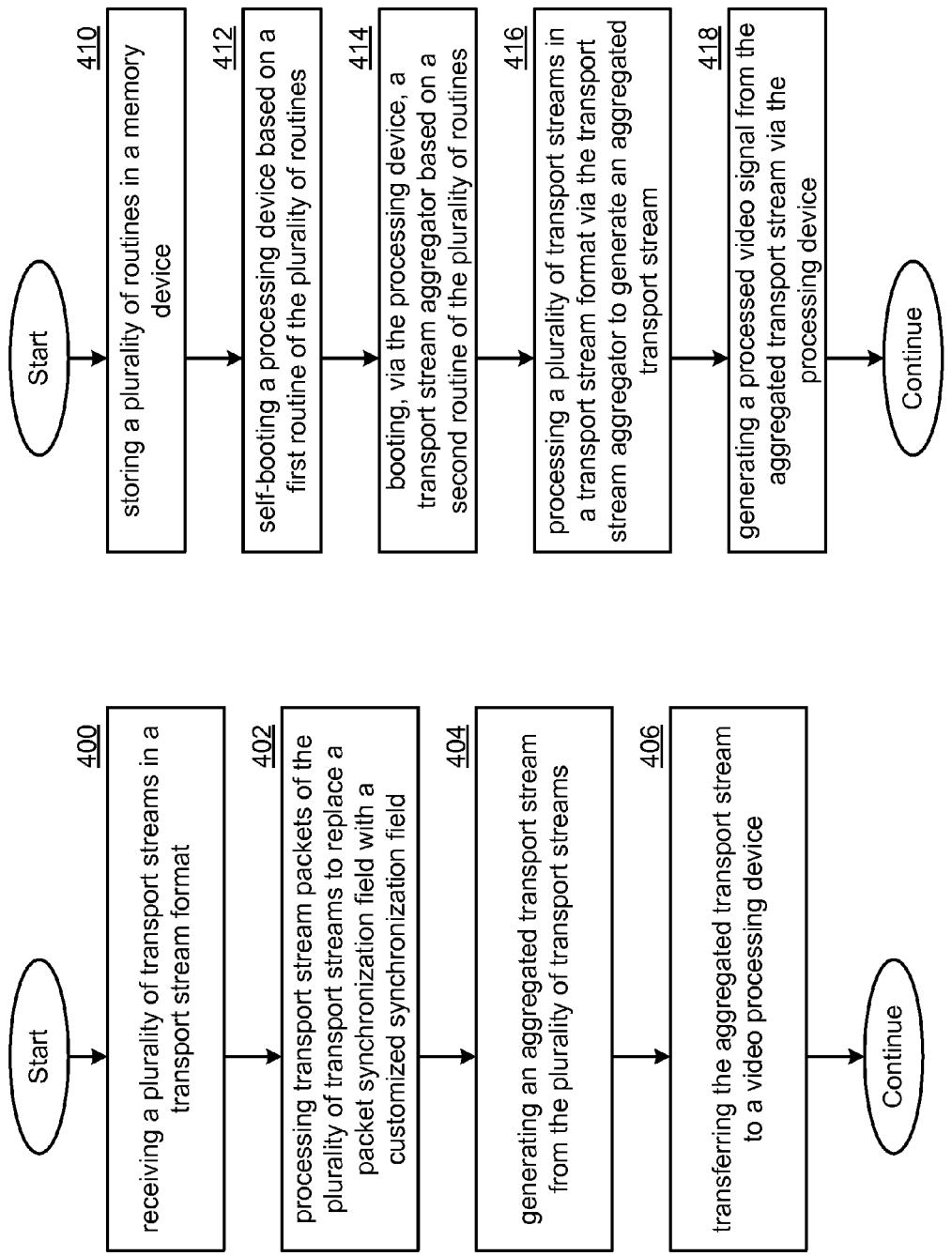
FIG. 9 presents a flowchart representation of a method in accordance with an embodiment of the present disclosure.
FIG. 10 presents a flowchart representation of a method in accordance with an embodiment of the present disclosure.

FIG. 9 presents a flowchart representation of a method in accordance with an embodiment of the present disclosure. In particular a method is presented for use in conjunction with one or more functions and features described in conjunction with FIGS. 1-8. Step 400 includes receiving a plurality of transport streams in a transport stream format. Step 402 includes processing transport stream packets of the plurality of transport streams to replace a packet synchronization field with a customized synchronization field. Step 404 includes generating an aggregated transport stream from the plurality of transport streams. Step 406 includes transferring the aggregated transport stream to a video processing device.

In an embodiment, the customized synchronization field includes a stream identifier that indicates one of the plurality of transport streams. Step 404 can include buffering the plurality of transport streams, and multiplexing the plurality of transport streams into the aggregated transport stream, based on at least one control signal. The method can further include generating the at least one control signal to control the multiplexing of the plurality of the transport streams into the aggregated transport stream and the transfer of the aggregated transport stream to the processing device. The at least one control signal can include a gated transport stream clock having clock pulses in a first period corresponding to valid data of the aggregated transport stream and no clock pulses in a second period not corresponding to valid data of the aggregated transport stream.

FIG. 10 presents a flowchart representation of a method in accordance with an embodiment of the present disclosure. In particular a method is presented for use in conjunction with one or more functions and features described in conjunction with FIGS. 1-9. Step 410 includes storing a plurality of routines in a memory device. Step 412 includes self-booting a processing device based on a first routine of the plurality of routines. Step 414 includes booting, via the processing device, a transport stream aggregator based on a second routine of the plurality of routines. Step 416 includes processing a plurality of transport streams in a transport stream format via the transport stream aggregator to generate an aggregated transport stream. Step 418 includes generating a processed video signal from the aggregated transport stream via the processing device.

In an embodiment, the processing device is self-booted by executing a self-initialization and retrieving the first routine from the memory device. The processing device then boots the transport stream aggregator by retrieving the second routine from the memory device and by pushing the second routine to the transport stream aggregator. The method can further include coupling the transport stream aggregator and the memory device to the processing device via a shared serial interface.

FIG. 11 presents a flowchart representation of a method in accordance with an embodiment of the present disclosure. In particular a method is presented for use in conjunction with one or more functions and features described in conjunction with FIGS. 1-10. Step 420 includes receiving a plurality of transport streams in a transport stream format. Step 422 includes processing transport stream packets of the plurality of transport streams to replace a packet synchronization field with a customized synchronization field. Step 424 include processing the transport stream packets of the plurality of transport streams to determine selected ones of the transport stream packets based on identifying duplicate packet identifiers from differing ones of the plurality of transport streams. Step 426 includes processing the transport stream packets of the plurality of transport streams to replace a packet identifier with a customized packet identifier for selected ones of the transport stream packets of the plurality of transport streams. Step 428 includes generating an aggregated transport stream from the plurality of transport streams. Step 430 includes transferring the aggregated transport stream to a video processing device.

FIG. 12 presents a flowchart representation of a method in accordance with an embodiment of the present disclosure. In particular a method is presented for use in conjunction with one or more functions and features described in conjunction with FIGS. 1-11. Step 430 includes generating a chip select signal wherein the chip select signal indicates one of: communication between the processing device and the memory device; and communication between the processing device and the transport stream aggregator. Step 432 includes coupling the chip select signal to the memory device and the transport stream aggregator.

FIG. 13 presents a flowchart representation of a method in accordance with an embodiment of the present disclosure. In particular a method is presented for use in conjunction with one or more functions and features described in conjunction with FIGS. 1-12. Step 440 includes coupling the transport stream aggregator to the processing device via a first serial interface. Step 442 includes coupling the memory device to the processing device via second serial interface that is separate from the first serial interface.

In an embodiment, the first serial interface operates in accordance with a first interface protocol and the second serial interface operates in accordance with a second interface protocol that is different from the first interface protocol.

FIG. 14 presents a flowchart representation of a method in accordance with an embodiment of the present disclosure. In particular a method is presented for use in conjunction with one or more functions and features described in conjunction with FIGS. 1-13. Step 450 includes coupling a slave device to the processing device. Step 452 includes booting, via the processing device, the slave device based on a third routine of the plurality of routines.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A processing system comprising:
    a transport stream aggregator that receives a plurality of transport streams in a transport stream format and that generates an aggregated transport stream in response, wherein the transport stream aggregator processes transport stream packets of the plurality of transport streams and replaces a packet synchronization field with a customized synchronization field by mapping a standard sync byte of the packet synchronization field to generate a customized sync byte that indicates one of the plurality of transport streams, and wherein the transport stream aggregator further processes the transport stream packets of the plurality of transport streams to:
        identify packet identifiers from differing transport stream packets of the plurality of transport streams that are duplicate packet identifiers;
        generate a subset of transport stream packets of the plurality of transport streams corresponding to the identified duplicate packet identifiers;
        generate customized packet identifiers corresponding to the transport stream packets in the subset; and
        replace the packet identifiers of the transport stream packets in the subset with the generated customized packet identifiers; and
    a processing device, coupled to the transport stream aggregator, configured to generate a processed video signal from the aggregated transport stream.

2. The processing system of claim 1, wherein the transport stream aggregator buffers the plurality of transport streams and multiplexes the plurality of transport streams into the aggregated transport stream.

3. The processing system of claim 2, wherein the transport stream aggregator generates at least one control signal to control the multiplexing of the plurality of transport streams into the aggregated transport stream and transfer of the aggregated transport stream to the processing device.

4. The processing system of claim 3 wherein the at least one control signal includes a gated transport stream clock.

5. The processing system of claim 4 wherein the gated transport stream clock includes clock pulses in a first period corresponding to valid data from the transport stream aggregator and no clock pulses in a second period corresponding to no valid data from the transport stream aggregator.

6. A method comprising:
    receiving a plurality of transport streams in a transport stream format;
    processing transport stream packets of the plurality of transport streams to:
        replace a packet synchronization field with a customized synchronization field by mapping a standard sync byte of the packet synchronization field to generate a customized sync byte that indicates one of the plurality of transport streams;
        identify packet identifiers from differing transport stream packets of the plurality of transport streams that are duplicate packet identifiers;
        generate a subset of transport stream packets of the plurality of transport streams corresponding to the identified duplicate packet identifiers;
        generate customized packet identifiers corresponding to the transport stream packets in the subset; and
        replace the packet identifiers of the transport stream packets in the subset with the generated customized packet identifiers;
    generating an aggregated transport stream from the plurality of transport streams; and
    transferring the aggregated transport stream to a video processing device.

7. The method of claim 6, wherein generating the aggregated transport stream from the plurality of transport streams includes:
    buffering the plurality of transport streams; and
    multiplexing the plurality of transport streams into the aggregated transport stream, based on at least one control signal.

8. The method of claim 7, further comprising:
    generating the at least one control signal to control the multiplexing of the plurality of transport streams into the aggregated transport stream and transfer of the aggregated transport stream to the video processing device.

9. The method of claim 8, wherein the at least one control signal includes a gated transport stream clock.

10. The method of claim 9, wherein the gated transport stream clock includes clock pulses in a first period corresponding to valid data of the aggregated transport stream and no clock pulses in a second period not corresponding to valid data of the aggregated transport stream.

* * * * *